United States Patent [19]
Brown et al.

[11] 3,872,563
[45] Mar. 25, 1975

[54] METHOD OF BLADE CONSTRUCTION
[75] Inventors: William H. Brown, North Palm Beach; Bruce T. Brown, Riviera Beach, both of Fla.
[73] Assignee: United Aircraft Corporation, East Hartford, Conn.
[22] Filed: Nov. 13, 1972
[21] Appl. No.: 306,134

[52] U.S. Cl.......... 29/156.8 H, 29/156.8 B, 416/97, 416/229, 415/115, 156/257
[51] Int. Cl............................................ B23p 15/04
[58] Field of Search....... 29/156.8 B, 23.5, 156.8 H; 416/97, 229; 156/253, 257, 258, 263, 252, 264, 265; 415/115

[56] References Cited
UNITED STATES PATENTS

| | | | |
|---|---|---|---|
| 2,853,271 | 9/1958 | Findley | 416/90 |
| 3,301,526 | 1/1967 | Chamberlain | 415/115 |
| 3,457,619 | 7/1969 | Kydd | 416/97 A |
| 3,515,499 | 6/1970 | Beer et al. | 416/95 |
| 3,781,130 | 12/1973 | Tall | 416/97 |

FOREIGN PATENTS OR APPLICATIONS
597,721  2/1948  United Kingdom ................ 416/229

Primary Examiner—C. W. Lanham
Assistant Examiner—Dan C. Crane
Attorney, Agent, or Firm—Jack N. McCarthy

[57] ABSTRACT

A method of forming a blade by the use of wafers which when placed together form a block big enough for the size of the blade desired. The wafers have coolant grooves placed thereon to provide the coolant passages for the finished blade. The wafers are placed together with a passageway being formed longitudinally therein intersecting the inner ends of the grooves. The wafers, after they are bonded together, have the outer contour of the blade completed with the outer ends of the coolant grooves being intersected by the outer contour. The blade root can be formed integrally with the airfoil portion of the blade. An opening extends through the blade root to deliver a coolant to the passageway formed in the wafers.

12 Claims, 2 Drawing Figures

METHOD OF BLADE CONSTRUCTION

BACKGROUND OF THE INVENTION

This invention relates to a method of forming a blade and particularly to the type wherein wafers are used. The U.S. Pat. No. 3,515,499 shows a blade formed using wafers. U.S. Pat. No. 3,301,526 shows a member of airfoil contour formed by wafers.

SUMMARY OF THE INVENTION

A primary object of the present invention is to provide an improved method for constructing a cooled blade from wafers for use in an aircraft engine.

In accordance with the present invention, a block formed from wafers is made large enough for the size of the blade desired, with grooves being placed on the wafers to provide cooling passages with an adjacent wafer, in a finished blade. Opening means in the blade deliver a coolant to the passages.

Further, in accordance with the present invention, the block is formed of oversized wafers having approximately the same surface area to provide uniform loading for bonding the wafers together. This also permits for removal of any imperfect bonding edge effects.

Further, in accordance with the present invention, locating holes are formed in each wafer which (1) provide for accurate positioning of the coolant grooves on each wafer (groove to wafer); (2) provide for accurate positioning of the wafer relative to each other in a stack for bonding (grooves to assembled block); (3) provide for working on the assembled block of wafers to properly arrive at the finished blade (grooves to machined blade).

DESCRIPTION OF THE PREFERRED EMBODIMENTS

Figure 1:
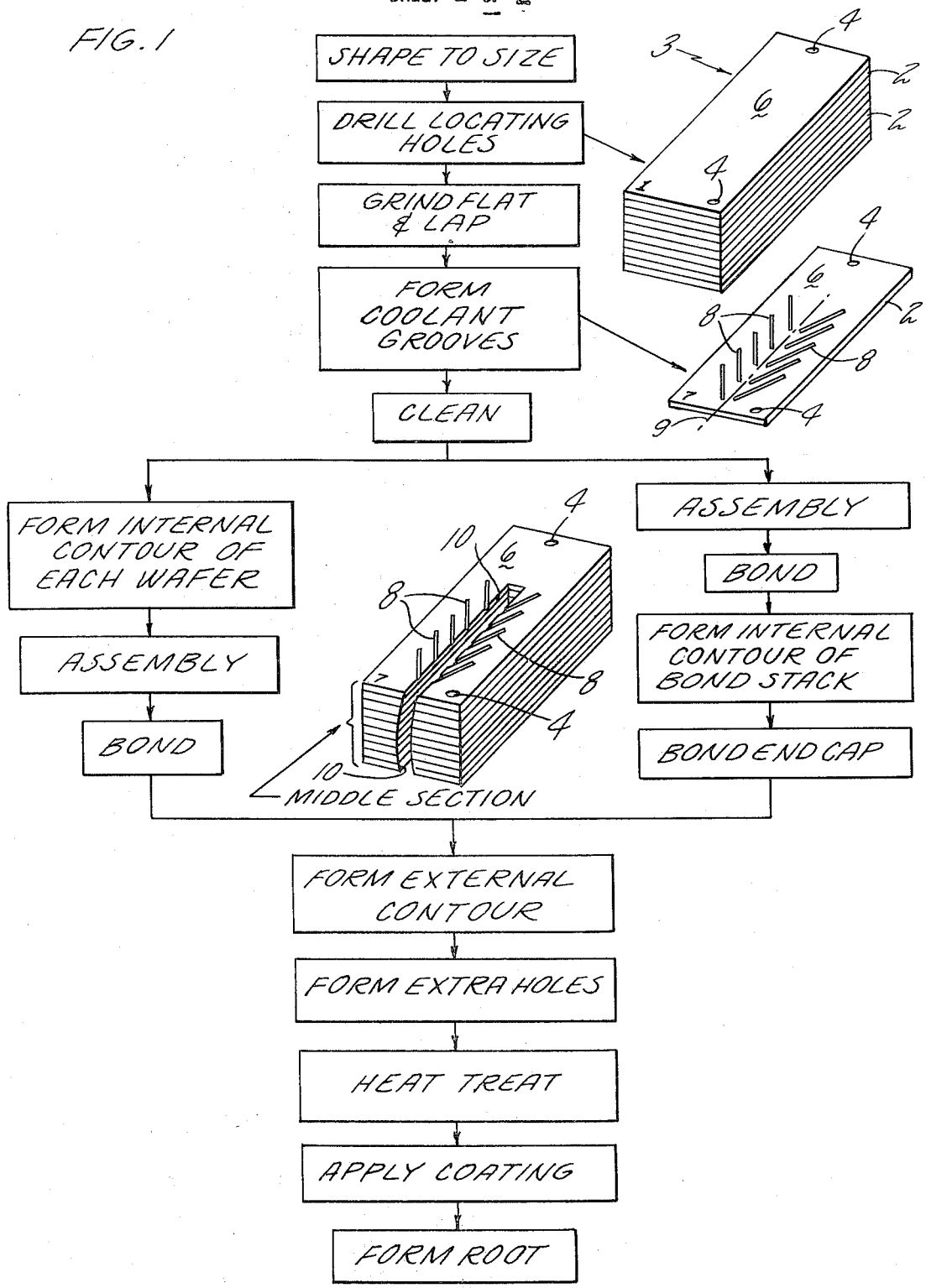
FIG. 1 is a chart showing steps taken to produce a blade.

Referring to FIG. 1, it is noted that a blade is formed from a plurality of wafers 2 of the same, or approximately the same, external dimensions and the same, or approximately the same, surface area placed together to form a block 3 big enough for the size of the blade desired. While the wafers 2 may be obtained by any means desired, they can be cut to size from rolled sheet, cut to size from a cast slab or block, or individually cast and machined to size.

After selecting the number of wafers 2 to form a block 3 of the proper size, they then have their flat adjoining surfaces 6 ground flat and lapped to provide for bonding together at a later time. Grooves are formed on the surfaces 6 to provide passages with adjacent surfaces for a purpose to be hereinafter described. The wafers 2 of the block 3 are numbered to insure that they are placed in their proper order for final assembly.

The wafers 2 are made oversized to provide for locating holes 4 which will provide for accurate positioning of the grooves on each wafer, accurate positioning of the wafers relative to each other for bonding, and for working on the assembled block of wafers to arrive at the finished blade with the grooves accurately placed. The wafers 2 are made of the same, or approximately the same, dimensions and surface area to provide wafers for bonding into a block which will have uniform, or nearly uniform, bonding on each wafersurface in the block as pressure is being applied externally on the end wafers during the bonding process.

Each wafer 2 then has coolant grooves 8 formed on each side thereof where coolant flow is desired. The coolant grooves 8 are shown in two rows, one row on each side of a center line 9 (see FIG. 1), one row of grooves will form passages through one side of a finished blade and the other row of grooveswill form passages through the other side of a finished blade (see FIG. 2). These grooves 8 are placed in a predetermined position on each wafer 2 so that when each wafer 2 has an internal opening 10 formed therein, the opening 10 intersects the inner ends of the grooves 8 which will form the inner ends of the coolant passages of the blade when the wafers are stacked properly together; and when the wafers 2 have their external contour formed, the external contour intersects the outer ends of the grooves 8 which will form the outer ends of the coolant passages. The internal openings 10 of the assembled block shown in FIG. 1 forms the cooling opening which will be within the finished airfoil section of the blade. The predetermined position can be determined by locating the two rows of grooves 8 so that the center lines 9 of each set of two rows of grooves on the sides of the wafers 2 will lie in a plane which will extend through the mean chord lines of each airfoil section of the final interior contour of the blade along its length.

Grooves 8 can be formed of various shapes to arrive at a desired cooling pattern and result. For example, the grooves 8 can be angled upwardly between two mating sides 6 of two wafers 2 and angled downwardly between two other mating sides 6 of two wafers 2 of the same blade. This difference in angling of the grooves 8 can be made alternately between the mating sides 6 of wafer 2 for the length of the blade. Wafer thickness can be varied to provide a greater number of cooling passages at predetermined locations along a blade, if necessary, for greater blade cooling.

Figure 2:
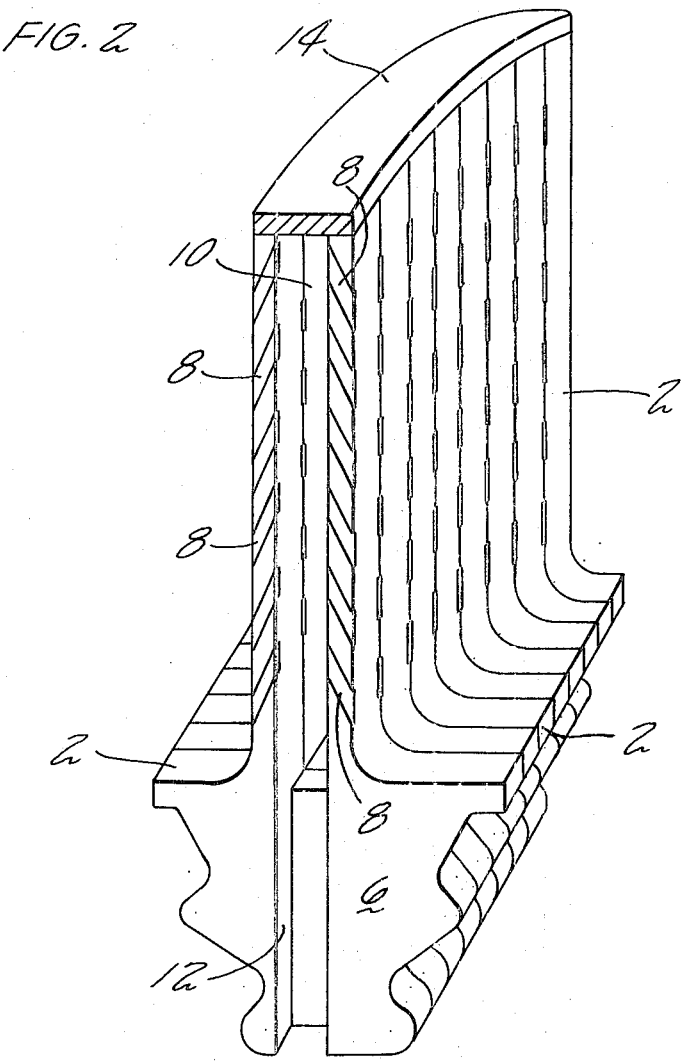
FIG. 2 is a perspective view of part of a finished blade.

It is noted that in some blade constructions the grooves 8 are located on both mating surfaces of wafers 2, while in other constructions the grooves 8 can be located on only one mating surface. Further, some constructions only require one row of grooves 8 on one side of the center line 9. Grooves 8 of mating surfaces of wafer 2 can cross each other, instead of overlapping as shown in FIG. 2, if desired, to achieve a different flow pattern.

The wafers are then cleaned by appropriate methods, these methods varying with the type of material used for the wafer and method of working, i.e., ECM, ECG, EDM, etc. At this point the method may be continued by assembling the wafers 2 in their proper order and bonding them together as a block. One method of bonding can be by the method shown in U.S. Pat. No. 3,678,570. After the assembly has been bonded together, means (such as EDM) can be used to form the internal openings 10 of the wafers 2 which in this method forms the completed internal contour of the passage in the airfoil section of the blade at once. In this method it is necessary to cut through from the top so as not to interfer with the forming of the root. This cut making the completed internal contour of the passage in the portion of the block which will be the airfoil section of the blade can extend into the portion which will be the platform and root section a small mount depending on the curvature of the airfoil section. Generally, the cut will extend only to approximately where the platform area will be. An opening 12, or openings are then cut from the root end where the root will be to intersect the passage formed by the openings 10, to provide an inlet which will permit a desired coolant flow rate. When the contour of the passage in the center of the blade is completed, an end cap 14 is bonded to the whole stack. This prepares the block to a point where it is ready for external working to form the external contour of the blade and root. Opening, or openings, 12 can be cut after the blade has had its external contour formed whole, or in part.

After the wafers have been cleaned as mentioned above, a second method may also be continued by forming the internal opening 10 of each wafer separately, where it is necessary to properly locate the individual openings 10 so that they will form the completed internal contour of the passage of an entire blade when assembled. When the internal opening 10 in each individual wafer 2 is completed, the wafers are assembled in their proper order and bonded together as a block. An end cap is not needed in this construction in view of the fact that the opening 10 in an individual wafer can leave a connecting piece at the top of the wafer which will form, with adjacent pieces, an integral end cap. Each internal opening 10, in this case, can be contoured to extend into the root portion of the blade by placing the extension in a predetermined position, knowing that it will fall within the root end of the blade root after it has had its root contour formed. When this is done the complete internal opening of the blade will be formed having an opening into the bottom of the blade root.

A sample blade was fabricated from Astroloy wafers, chemically etched and TLP$^{TM}$ bonded together. The internal and external contours of the airfoil section were cut by EDM (electric discharge machining) and the root form was cut by conventional grinding methods. In one construction of a test blade the wafers used were ground flat and lapped to 0.065 inches in thickness. The flow of coolant through the passage in the walls of the blade can be controlled by their shaping, size, and angle of entry through the wall of the blade.

We claim:

1. In a method of making a finished blade from a plurality of wafers, the steps of:
   1. selecting a plurality of oversized wafers of approximately the same area so as to form a block big enough for the size of the finished blade;
   2. forming coolant grooves on at least one mating surface of a plurality of said wafers which do not intersect the edge of said wafers;
   3. forming internal openings in a plurality of said wafers to form a longitudinal internal passage in the finished blade;
   4. intersecting said coolant grooves with said internal openings to form the inner ends of said coolant grooves;
   5. stacking said wafers together;
   6. bonding said stack of wafers together;
   7. forming an external contour on said wafers to form the external surface of the finished blade;
   8. intersecting said coolant grooves with said external surface to form the outer ends of said coolant grooves.

2. A method of making a finished blade from a plurality of wafers as set forth in claim 1 wherein step (2) said coolant grooves are on both mating surfaces of wafers and are positioned and sized to overlap and form a coolant passage.

3. A method of making a finished blade from a plurality of wafers as set forth in claim 1 wherein step (2) said coolant grooves are formed of two rows of grooves, wherein one row of grooves will form passages through one side of the finished blade and the other row of grooves will form passages through the other side of a finished blade.

4. A method of making a finished blade from a plurality of wafers as set forth in claim 3 wherein step (2) the grooves of both rows are angularly displaced with reference to each other.

5. A method of making a finished blade from a plurality of wafers as set forth in claim 1 including the step of:
   9. forming locating holes in said wafers for accurately locating coolant grooves, for properly stacking said wafers together, and for properly shaping the internal opening and external contour.

6. A method of making a finished blade from a plurality of wafers as set forth in claim 1 wherein step (2) said coolant grooves are on both mating surfaces of at least some of adjacent pairs of wafers.

7. As in claim 1 wherein step (5) said wafers are stacked to accurately position each wafer relative to each other thereby accurately positioning coolant grooves on each wafer.

8. A method as set forth in claim 1 wherein steps (5) and (6) include stacking and bonding the wafers in a radial plane.

9. A method as set forth in claim 1 wherein step (1) includes varying wafer thickness to control the location of cooling passages at predetermined locations along a blade.

10. In a method of making a finished blade from a plurality of wafers, the steps of:
    1. selecting a plurality of over-sized wafers of approximately the same area so as to form a block big enough for the size of the finished blade;
    2. forming coolant grooves on at least one mating surface of a plurality of said wafers which do not intersect the edge of said wafers;
    3. forming an inner opening in each of said wafers having coolant grooves, said opening extending in a lengthwise direction so as to form a span-wise segment of a longitudinal internal passage in the finished blade;
    4. intersecting the coolant grooves on each wafer with each cooperating internal opening to form the inner ends of said coolant grooves;
    5. stacking said wafers together;
    6. bonding said stack of wafers together;
    7. forming an external contour on said bonded wafers to form the external surface of the finished blade;
    8. intersecting the coolant grooves on each wafer with each cooperating external surface to form the outer ends of said coolant grooves.

11. In a method of making a finished blade from a plurality of wafers, the steps of:
    1. selecting a plurality of oversized wafers of approximately the same area so as to form a block big enough for the size of the finished blade;

2. forming coolant grooves on at least one mating surface of a plurality of said wafers which do not intersect the edge of said wafers;
3. stacking said wafers together;
4. bonding said stack of wafers together;
5. forming internal openings in a plurality of said wafers to form a longitudinal internal passage in the finished blade;
6. intersecting said coolant grooves with said internal openings to form the inner ends of said coolant grooves;
7. forming an external contour on said wafers to form the external surface of the finished blade;
8. intersecting said coolant grooves with said external surface to form the outer ends of said coolant grooves.

12. A method of making a finished blade from a plurality of wafers as set forth in claim 11 wherein step (2) said coolant grooves are formed of two rows of grooves, wherein one row of grooves will form passages through one side of the finished blade and the other row of grooves will form passages through the other side of a finished blade.

* * * * *